United States Patent
Yamasaki (12) 
(10) Patent No.: US 7,089,215 B2
(45) Date of Patent: Aug. 8, 2006

(54) REMOTE NEGOTIATION APPARATUS, REMOTE NEGOTIATION METHOD, AND PROGRAM PRODUCT

(75) Inventor: Shinya Yamasaki, Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/761,404

(22) Filed: Jan. 22, 2004

(65) Prior Publication Data
US 2004/0153423 A1 Aug. 5, 2004

(30) Foreign Application Priority Data
Jan. 28, 2003 (JP) .............................. 2003-018810

(51) Int. Cl.
G06Q 99/00 (2006.01)
G06Q 30/00 (2006.01)
(52) U.S. Cl. ......................................... 705/80; 705/26
(58) Field of Classification Search .................. 705/26, 705/27, 80; 715/751–759
See application file for complete search history.

(56) References Cited

U.S. PATENT DOCUMENTS 6,067,531 A * 5/2000 Hoyt et al. .................... 705/35

2001/0034689 A1 10/2001 Heilman, Jr.
2001/0044769 A1* 11/2001 Chaves ......................... 705/37
2002/0059141 A1 5/2002 Davies et al.
2002/0065887 A1 5/2002 Paik et al.

FOREIGN PATENT DOCUMENTS

| EP | 1443443 A2 * | 8/2004 |
|---|---|---|
| JP | 2002-183583 | 6/2002 |
| JP | 2002-215944 | 8/2002 |

OTHER PUBLICATIONS

Rugullies, Erica: "Showcase Your Products Online", e-Business Advisor, v17, i8, p16, Sep. 1999.*
U.S. Appl. No. 10/761,402, filed Jan. 22, 2004, Shinya Yamasaki.

* cited by examiner

*Primary Examiner*—Jeffrey A. Smith (57) ABSTRACT

For a car as merchandise specified by remote negotiation, a commercial transaction document such as an estimate, a contract, or a purchase order which decides an amount related to providing of the merchandise is prepared on the same system and stored in a database in accordance with an operation on a salesperson terminal by a salesperson (provider). A receiver such as a customer can browse (display) the prepared commercial transaction document by using a user terminal. The commercial transaction document to be browsed is provided as document data or a printing product.

7 Claims, 8 Drawing Sheets

| ESTIMATE PROVIDING METHOD |

☐ Fax :  ___________________

☐ mail : ___________________
       ☐ pdf    ☐ Word    ☐ txt ☐ MAIL : ___________________
   (ADDRESS)
       NAME ___________________

```
┌─────────────────────────────────────────────────┐
│ ESTIMATE PROVIDING DESTINATION         _ □ ✕    │
│ DESIGNATION FOR THIRD PARTY                     │
│                                                 │
│  NAME : ___________________                     │
│                                                 │
│                                      ☐ Web      │
│  ☐ mail    : ________________        ☐ pdf      │
│                                      ☐ txt      │
│                                                 │
│  ☐ Fax     : ________________                   │
│                                                 │
│  ☐ MAIL    : ________________                   │
│    (ADDRESS)                                    │
│                                      ┌──────┐   │
│                                      │  OK  │   │
│                                      └──────┘   │
└─────────────────────────────────────────────────┘
```

REMOTE NEGOTIATION APPARATUS, REMOTE NEGOTIATION METHOD, AND PROGRAM PRODUCT

FIELD OF THE INVENTION

The present invention relates to the technical field of a remote negotiation system in which a provider who provides merchandise or a service and a receiver who receives it negotiate through various communication lines.

BACKGROUND OF THE INVENTION

Conventionally, techniques are proposed in which a provider who provides merchandise or a service and a receiver who receives it do negotiation (remote negotiation) through various communication lines without actually facing each other (e.g., Japanese Patent Laid-Open Nos. 2002-183583 and 2002-215944).

These prior arts describe the basic concept of remote negotiation but do not sufficiently disclose any detailed system configuration for implementation.

In the above remote negotiation systems, generally, a salesperson and a customer negotiate without actually facing each other. During the negotiation, the communication means used imposes restrictions on communication between them. Hence, for example, when the service desired by the customer is specified by the remote negotiation, and accordingly, the salesperson side prepares so-called documents necessary for commercial transactions, including estimates, purchase orders, and contracts, there is no means for providing each prepared commercial transaction document to the customer.

In the conventional remote negotiation system, to quickly provide the prepared commercial transaction document to the customer, the document information of the commercial transaction document is transmitted by using a communication means such as e-mail. However, it is relatively easy to tamper document information. Hence, it is not preferable to easily transmit the document information of a commercial transaction document that contains the service providing price and the like to many unspecified customers.

In purchasing merchandise, one customer as the party concerned generally makes a decision alone. However, for merchandise such as a car, not only the customer as the party concerned but also a plurality of direct or indirect customers, including acquaintances and family, are often involved. When this point is taken into consideration, the conventional remote negotiation system is very convenient because it allows face-to-face negotiation between a salesperson and a customer, who are not physically in the same location but at remote sites, so that a plurality of persons can participate in the negotiation without physically gathering in the same site at the same time. However, the conventional remote negotiation system has no means for providing a commercial transaction document such as an estimate to the customer, as described above. It is not preferable to easily transmit the document information to the plurality of customers involved in the remote negotiation.

SUMMARY OF THE INVENTION

It is an object of the present invention to easily and effectively provide a commercial transaction document related to merchandise or a service specified by remote negotiation through a communication environment from a provider to a receiver.

Accordingly, one aspect of the present invention provides a remote negotiation apparatus which causes, before providing a service including sales of merchandise, a provider of the service and a receiver to do remote negotiation through a communication environment, comprising:

a control unit which displays a window of a predetermined format corresponding to a commercial transaction document related to providing of the service on a first operation terminal used by the provider (e.g., a salesperson), requests the provider to execute an input operation on the window to input information contents necessary for preparing the commercial transaction document, and stores the information contents of the commercial transaction document prepared by the input operation in a storage device, and displays, on a second operation terminal used by the receiver (e.g., a prospective buyer or user), a commercial transaction document having the same contents as those of the commercial transaction document prepared by the provider, on the basis of the information contents of the commercial transaction document in the storage device in accordance with a browsing request from the receiver.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

A preferred embodiment of the present invention will now be described in detail with reference to the drawings. It should be noted that the relative arrangement of the components, the numerical expressions and numerical values set forth in the embodiment do not limit the scope of the present invention unless it is specifically stated otherwise.

An embodiment will be described below in detail with reference to the accompanying drawings, in which a remote negotiation apparatus (remote negotiation system) according to the present invention is applied to remote negotiation related to the sales of a car (including various services such as automobile inspection and routine check) as an example of a service. In the embodiment, various documents (paper documents) necessary for commercial transactions, such as estimates, contracts, and purchase orders, will be collectively called "commercial transaction documents".

Figure 1:
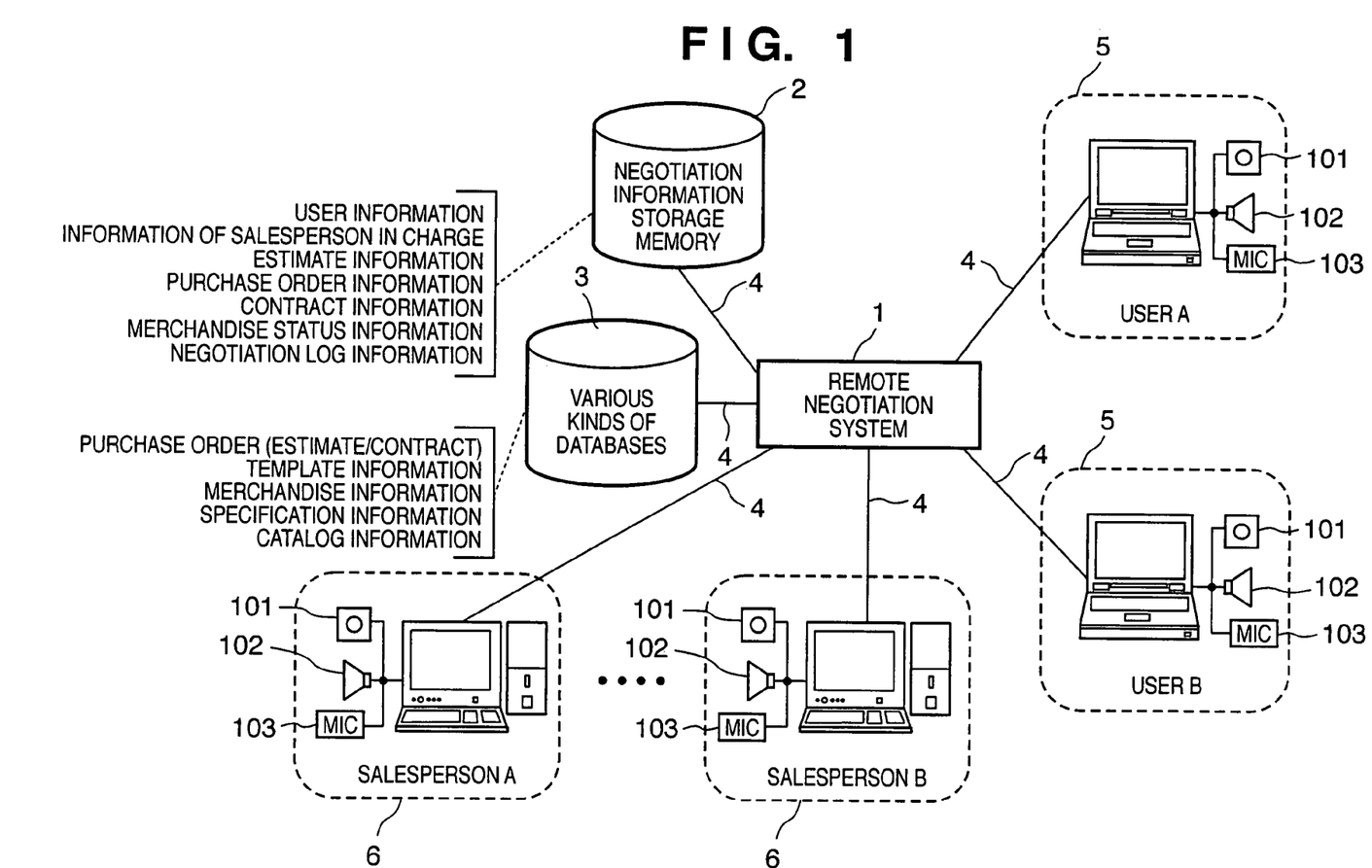
FIG. 1 is a view showing the system configuration of a remote negotiation system according to the embodiment.

FIG. 1 is a view showing the system configuration of a remote negotiation system according to the embodiment.

Referring to FIG. 1, a remote negotiation system 1, user terminals 5 used by customers (user A, user B, . . . ), and salesperson terminals 6 used by salespersons (salesperson A, salesperson B, . . . ) are connected so that two-way communication can be executed through a communication network (to be simply referred to as a network hereinafter) 4 such as the Internet or an intranet as an example of a communication line.

The remote negotiation system 1 is a general term for remote negotiation system software programs which are executed in a remote negotiation system server (not shown) and operation terminals 5 and 6 connected to the network 4. The network is not limited to the Internet or intranet and can include any other communication infrastructures.

In this embodiment, the salesperson A, salesperson B, . . . are providers of merchandise, i.e., cars. The user A, user B, . . . are receivers who receive the merchandise.

Each of the user terminals (second operation terminals) 5 and salesperson terminals (first operation terminals) 6 are an information processing apparatus (operation terminal) such as a personal computer that has, e.g., a photographing graphing function, voice output function, and voice input function, as shown in FIG. 1. Each operation terminal has a photographing device (camera) 101, speaker 102, and microphone 103. When remote negotiation processing (to be described later) is executed in the remote negotiation system 1, the user terminal 5 and salesperson terminal 6 are connected in a remote negotiable state.

In place of a desktop information processing apparatus shown in FIG. 1, an information terminal such as a PDA (Personal Digital Assistant) or cellular phone may be employed as each of the user terminals 5 and salesperson terminals 6. A detailed description of hardware in this embodiment will be omitted.

In this embodiment, the user terminal 5 and salesperson terminal 6 transmit or receive data through the network 4 in accordance with general communication protocol software (software program). The terminals have software programs for, e.g., an Internet browser function, mail function, and drawing function. When these software programs are appropriately executed by a CPU (not shown), the user terminal 5 and salesperson terminal 6 are connected in a remote negotiable state through the network 4 while being connected to (e.g., logged in to) the remote negotiation system 1. The communication means in these apparatuses employs a general arrangement, and a detailed description thereof will be omitted in this embodiment.

The remote negotiation system 1 can access a negotiation information storage memory (database) 2 and various kinds of databases (to be simply referred to as a database hereinafter) 3 to read or write the contents of the databases.

In the negotiation information storage memory (database) 2, the following pieces of information are registered in correspondence with each user.

User information: information that specifies a customer (prospective buyer or existing user)

Salesperson information: information about a person in charge of sales, who sells cars by using this system Estimate information: information about an estimate prepared for the customer Purchase order information: information about a purchase order prepared for the customer Contract information: information about a contract prepared for the customer Merchandise status information: information about the progress of negotiation with the customer and the progress until delivery after the contract Negotiation log information: log information about negotiation with the customer In the database (DB) 3, the following pieces of information are registered in advance.

Commercial transaction document template information: document (paper document) information of predetermined formats for estimates, contracts, and purchase orders prepared in remote negotiation Merchandise information: information (including image information) about merchandise such as cars that can be sold by using this system and contending vehicles Specification information: detailed specification information of merchandise such as cars that can be selected by using this system Catalog information: catalog information of merchandise such as cars that can be sold by using this system In this embodiment, a system configuration in which the remote negotiation system 1 accesses two databases, i.e., the negotiation information storage memory (database) 2 and DB 3, as described above, will be described for the descriptive convenience. However, the present invention is not limited to this system configuration. A system configuration in which all pieces of information are stored in a large-scale database together may be employed.

The processing of the entire system will be described below mainly on the basis of the operation of the remote negotiation system 1.

In this embodiment, an example will be described in which as remote negotiation processing to be described below is executed in the remote negotiation system 1, necessary man-machine interfaces (user interfaces) such as display windows are provided using, e.g., the Internet browser function in the user terminal 5 and salesperson terminal 6 by using data based on a predetermined data format (e.g., HTML: HyperText Markup Language or XML: eXtensible Markup Language) received from the remote negotiation system 1 through a communication line such as the network 4.

However, the remote negotiation processing system according to this embodiment is not limited to this system configuration. Some or all of processing operations to be described below may be executed in at least one of the user terminal 5 and salesperson terminal 6.

Figure 2:
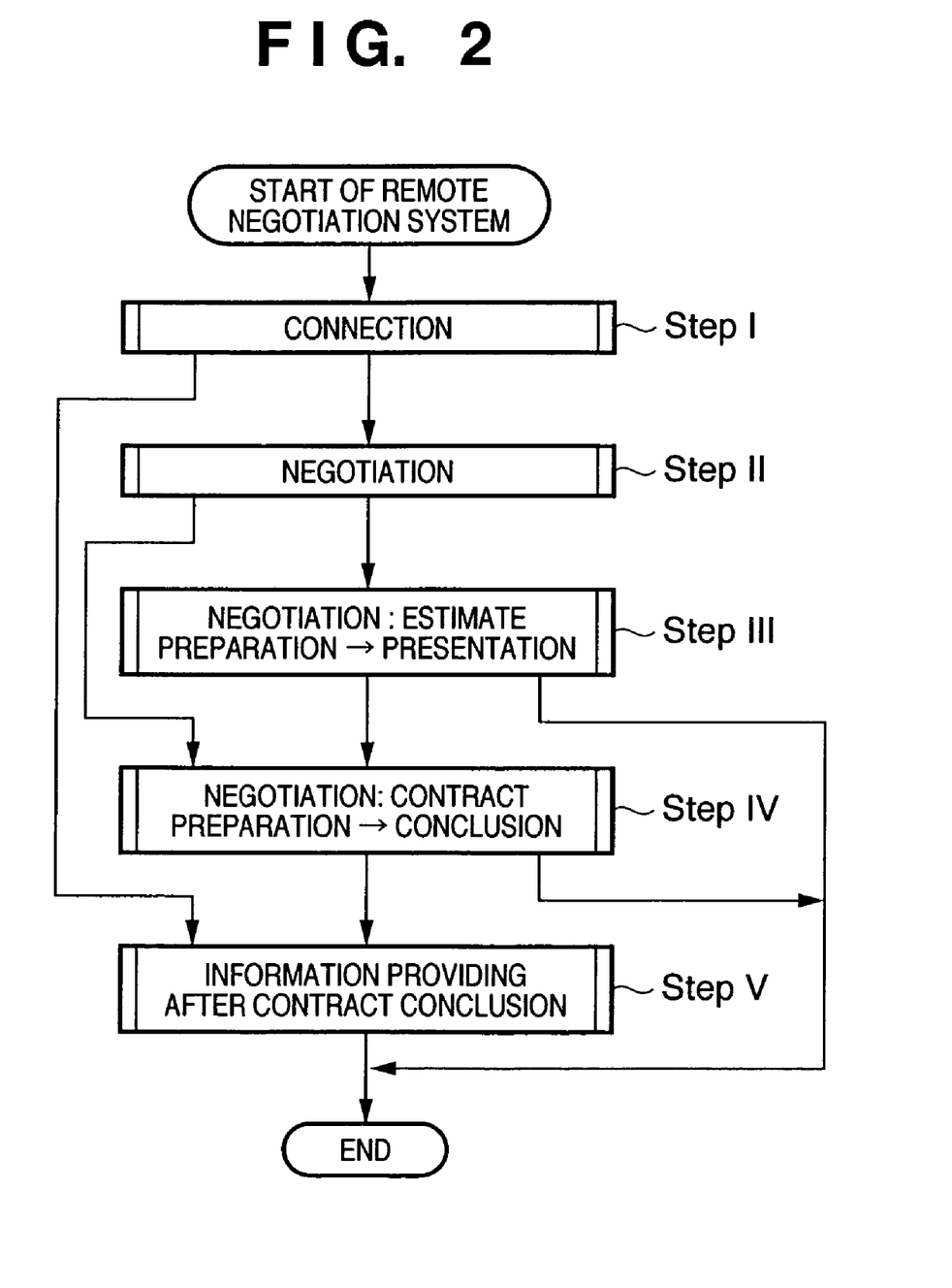
FIG. 2 is a flow chart showing remote negotiation processing in the remote negotiation system according to the embodiment.

FIG. 2 is a flow chart showing the remote negotiation processing of the remote negotiation system according to the embodiment. FIG. 2 shows the operation procedures of the software program in the remote negotiation system.

Referring to FIG. 2, step I (connection): When a predetermined connection request operation from the user terminal 5 or salesperson terminal 6 is detected, at least two operation terminals to be connected with each other are set in a remote negotiable state. For the connection processing itself in this step, general procedures can be employed, and a detailed description thereof will be omitted in this embodiment. The flow can advance from this step to step II (if no purchase contract has been made yet) or step V (if a purchase contract has already been made) in accordance with a predetermined operation.

Step II (negotiation or start of negotiation): Between the user terminal 5 and the salesperson terminal 6 which are connected through the communication line in step I, the photographing device (camera) 101, speaker 102, microphone 103, and display window (display areas 23 and 25 in display windows shown in FIGS. 3 and 4 to be described later), which are arranged in the respective operation terminals, appropriately function to start real-time remote negotiation between the customer who uses the user terminal 5 and the salesperson who uses the salesperson terminal 6. The customer and salesperson can have various conversations (explanation of the specifications and negotiation over the price), as in conventional face-to-face negotiation. The flow can advance from this step to step III (if an estimate must be prepared) or step IV (if a contract must be prepared) in accordance with a predetermined operation.

Step III (negotiation: estimate preparation→presentation): On the basis of the customer's needs and various conditions confirmed in the remote negotiation in step II, the salesperson prepares an estimate for a formal contract of commercial transaction documents about the car (merchandise) demanded by the customer as the other party of negotiation by using the display window shown in FIG. 3 (to be described later). In the process for preparing the estimate, an estimate with the same contents is presented to the customer on the display window shown in FIG. 4 (to be described later). The flow can advance from this step to step IV (when a contract can be prepared), or the remote negotiation can be ended (if the customer should examine the presented estimate) in accordance with a predetermined operation.

Step IV (negotiation: contract preparation→conclusion): When the customer agrees to the contents of the estimate presented in step III and indicates his/her willingness to purchase, the salesperson prepares a contract (purchase order) of commercial transaction documents about the car (merchandise) demanded by the customer as the other party of negotiation by using the display window shown in FIG. 3 (to be described later). In addition, the salesperson concludes a sales contract based on the contents of the contract with the customer. In the process for preparing the contract, a contract with the same contents is presented to the customer on the display window shown in FIG. 4 (to be described later). The flow can advance from this step to step V, or the remote negotiation can be ended in accordance with a predetermined operation.

Step V (information providing after contract conclusion): When the purchase contract has already been made in step IV, the customer can receive information (e.g. information about the progress until delivery and procedures in public institutions) about the vehicle of the purchase contract. Such information providing is done in accordance with the contents of an inquiry by real-time conversations with the salesperson or automatic response.

The processing procedures in steps II and IV of the above-described remote negotiation processing (FIG. 2) will be described next in detail with reference to FIGS. 3 to 8.

Figure 3:
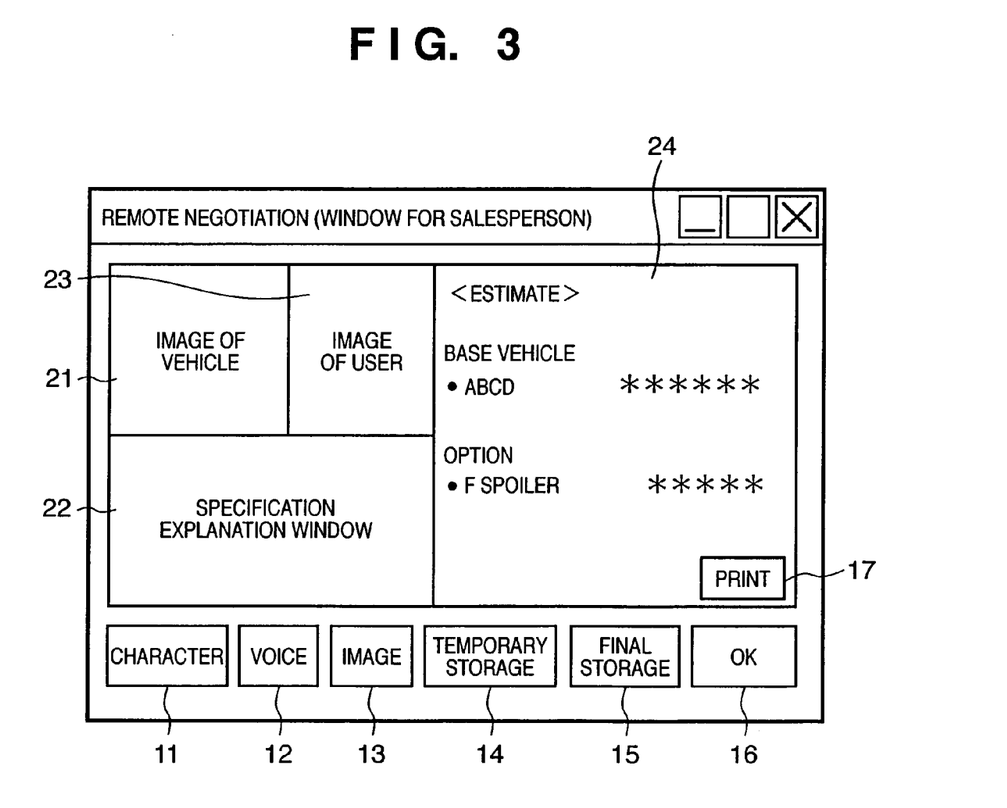
FIG. 3 is a view showing a display window which is displayed on a salesperson terminal 6 in the remote negotiation processing according to the embodiment.
Figure 4:
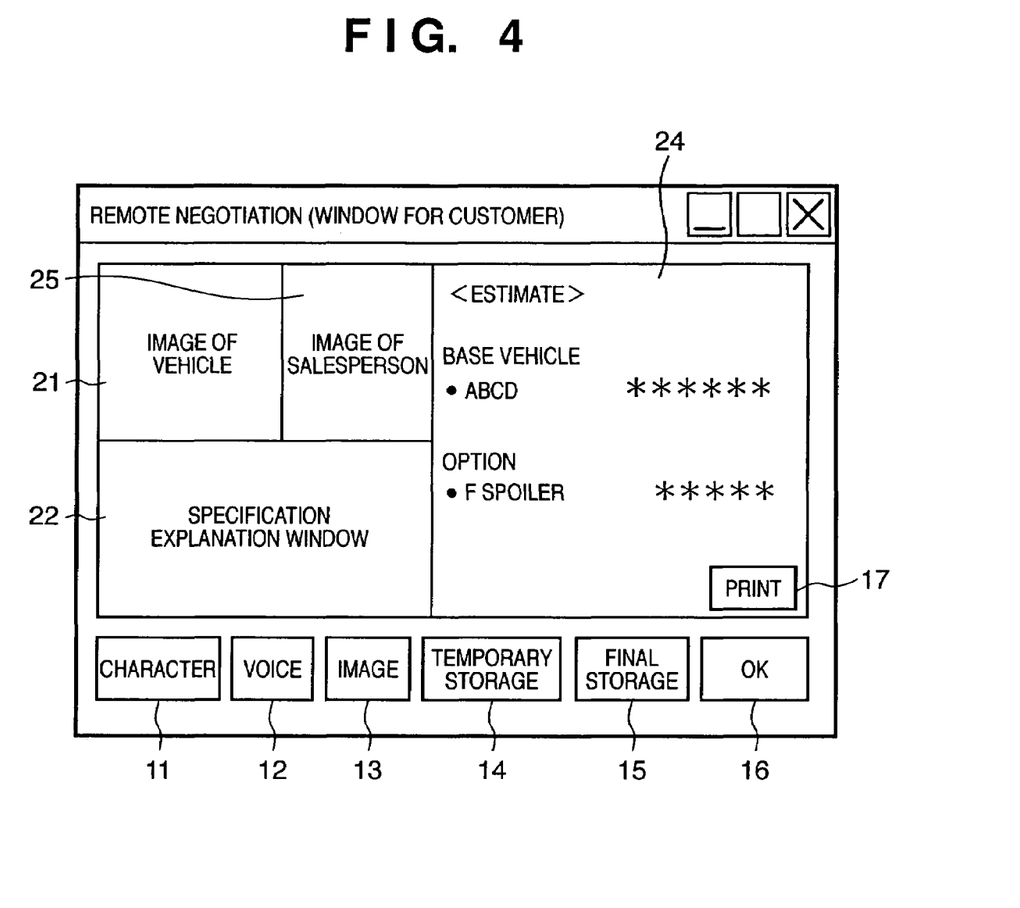
FIG. 4 is a view showing a display window which is displayed on a user terminal 5 in the remote negotiation processing according to the embodiment.

FIG. 3 is a view showing a display window which is displayed on the salesperson terminal 6 in the remote negotiation processing according to the embodiment. FIG. 4 is a view showing a display window which is displayed on the user terminal 5 in the remote negotiation processing according to the embodiment. Display of the display windows is started when the user terminal 5 and salesperson terminal 6 are set in the remote negotiable state through the remote negotiation system 1 in step I described above.

In this embodiment, when the user (customer) of the user terminal 5 designates a specific third party (e.g., his/her family or acquaintance) involved in the remote negotiation by using an estimate providing destination designation window for a third party (FIG. 8) (to be described later), the same display window (FIG. 4) as that on the user terminal 5 can be displayed even on the operation terminal used by the third party by processing from step S17 in FIG. 6 (to be described later).

The display windows shown in FIGS. 3 and 4 are used by the salesperson and the customer for smooth remote negotiation based on their agreements and common recognitions. Hence, the pieces of information included in the display windows basically have the same contents.

In the display windows shown in FIGS. 3 and 4, the image of the vehicle as the subject of the remote negotiation is displayed in a display area 21 by using information read out from the database 3. The explanation of specifications of the vehicle is displayed in a display area 22 by using information read out from the database 3.

The image of the customer (i.e., the user of the user terminal 5) photographed by the photographing device 101 arranged in the user terminal 5 is displayed in the display area 23. The image of the salesperson (i.e., the salesperson who uses the salesperson terminal 6) photographed by the photographing device 101 arranged in the salesperson terminal 6 is displayed in the display area 25.

A predetermined format of a commercial transaction document (estimate or contract) to be prepared is displayed in a display area 24 by using information read out from the database 3.

In the display windows shown in FIGS. 3 and 4, operation buttons (software buttons) 11 to 13 ("character", "voice", and "image") are used as a selection means for selecting at least one of characters, voice, and image as a detailed form of communication between the customer and the salesperson in the remote negotiation between the user terminal 5 and the salesperson terminal 6. When each of the user terminal 5 and salesperson terminal 6, which are connected in a remote negotiable state, has the photographing device 101, speaker 102, and microphone 103, as shown in FIG. 1, more realistic face-to-face negotiation can be done during the remote negotiation by operating (clicking on) all the operation buttons.

An operation button (software button) 14 ("temporary storage") is used to store, in the storage area for the customer in the negotiation information storage memory (database) 2, the storage states of individual information contents (information items), which are input to the commercial transaction document (estimate or contract) displayed in the display area 24 during the remote negotiation process between the customer and the salesperson using the user terminal 5 and salesperson terminal 6, not as final information contents but as a temporarily prepared document or unfinished document.

An operation button (software button) 15 ("final storage") is used to store, in the storage area for the customer in the negotiation information storage memory (database) 2, the storage states of individual information contents (information items), which are input to the commercial transaction document (estimate or contract) displayed in the display area 24 during the remote negotiation process between the customer and the salesperson using the user terminal 5 and salesperson terminal 6, as a formal document to which both parties have agreed.

An operation button (software button) 17 ("print") is used to print the commercial transaction document (estimate or contract) displayed in the display area 24 on a printing paper sheet.

In steps III and IV, a corresponding commercial transaction document is prepared by using the remote negotiation display windows (FIGS. 3 and 4) having the above display contents.

Procedures for presenting a prepared commercial transaction document will be described next by exemplifying estimate preparation processing executed in step III. In the following description, the commercial transaction document to be prepared is an estimate. However, these procedures are also executed even to prepare a contract (purchase order).

Figure 5:
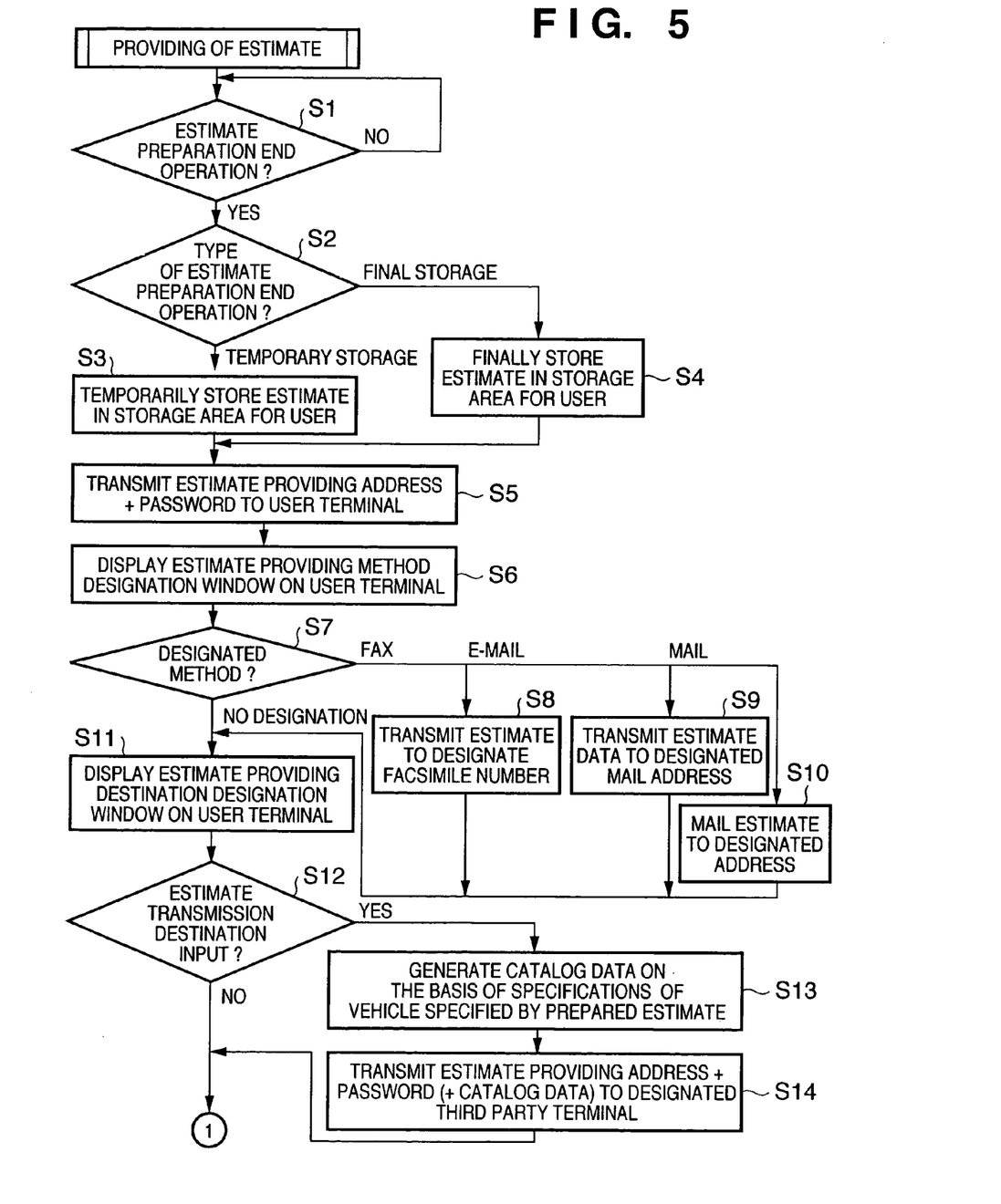
FIG. 5 is a flow chart of commercial transaction document providing processing according to the embodiment.
Figure 6:
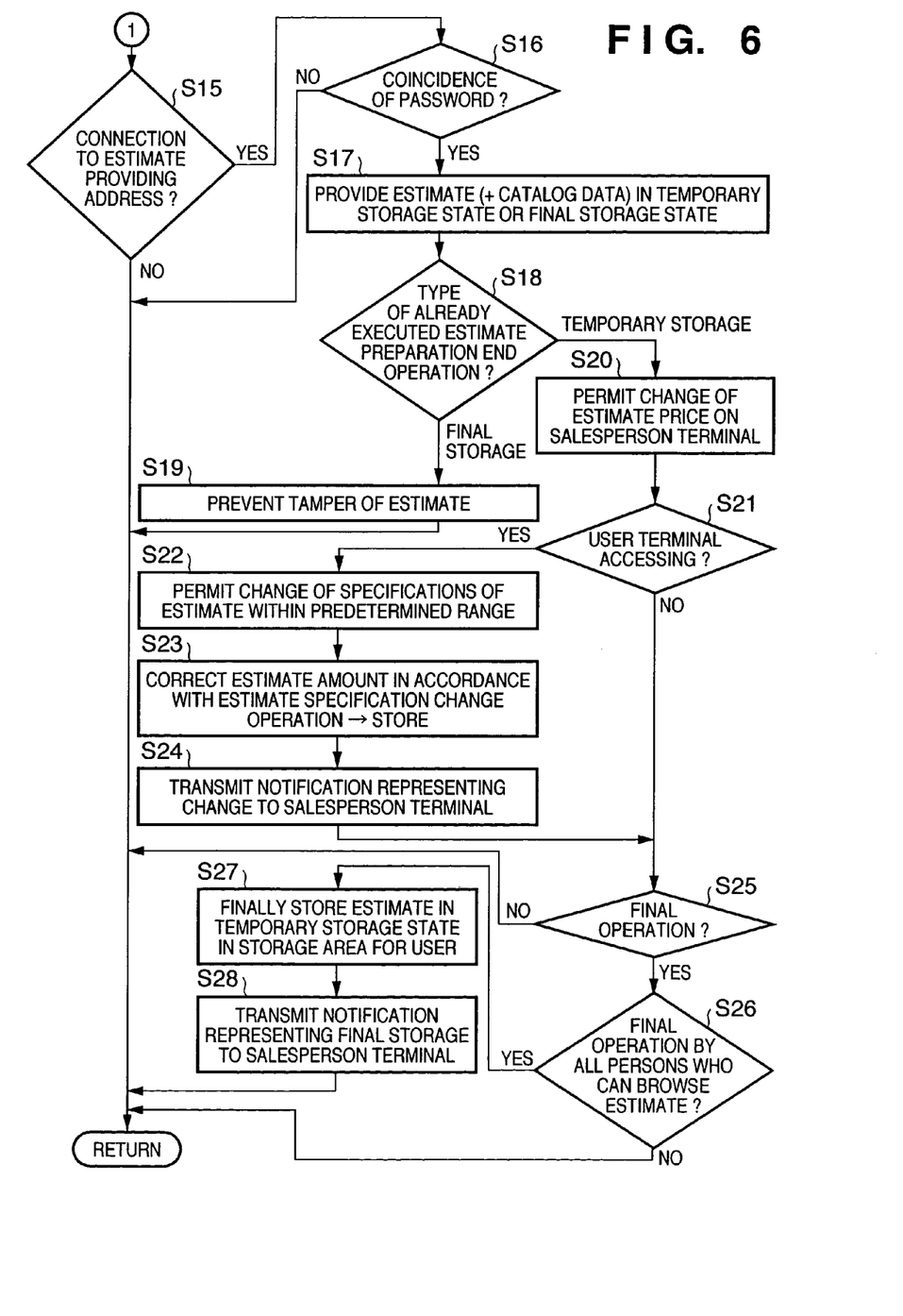
FIG. 6 is a flow chart of commercial transaction document providing processing according to the embodiment.

FIGS. 5 and 6 are flow charts of commercial transaction document providing processing according to this embodiment. FIGS. 5 and 6 show, as an example, details of processing executed after estimate preparation is ended in step III of remote negotiation processing (FIG. 2). In step III, the estimate itself is appropriately prepared between the customer and the salesperson who are in the remote negotiation by using the display window (FIG. 4) displayed on the user terminal 5, the display window (FIG. 3) displayed on the salesperson terminal 6, and voice output on both terminals.

Referring to FIG. 5, step S1: When the operation button 14 or 15 displayed on the display window (FIG. 3 or 4) of the user terminal 5 or salesperson terminal 6 is operated to indicate that estimate preparation that has been done so far between the customer and the salesperson during the remote negotiation is ended, and then, an OK button 16 is operated, the flow advances to step S2.

Steps S2 to S4: The operation button operated in step S1 is discriminated to determine whether the detected operation is "temporary storage" including the operation of the operation button 14 or "final storage" including the operation of the operation button 15 (step S2). For "temporary storage", the individual information contents (information items) input to the commercial transaction document (in this case, the estimate) displayed in the display area 24 are stored in the storage area for the customer in the negotiation information storage memory (database) 2 in a "temporary storage state" (step S3). On the other hand, for "final storage", the individual information contents are stored in the storage area for the customer in the database as a formal document in a "final storage state" (step S4).

Step S5: As information about the finished commercial transaction document, an estimate providing address and a password (i.e., the URL (Uniform Resource Locator) of a predetermined Web page where the estimate can be provided and a password necessary for logging in to the Web page) are transmitted to the user terminal 5 used by the customer. When the customer accesses the predetermined Web page by using the received estimate providing address and password, he/she can browse, at a desired timing, a commercial transaction document having the same contents as in the commercial transaction document (in this case, the estimate) on the basis of the information contents stored in the negotiation information storage memory (database) 2 in step S3 or S4.

Step S6: Information to display an estimate providing method designation window (FIG. 7) is transmitted to the user terminal 5 used by the customer.

Figure 7:
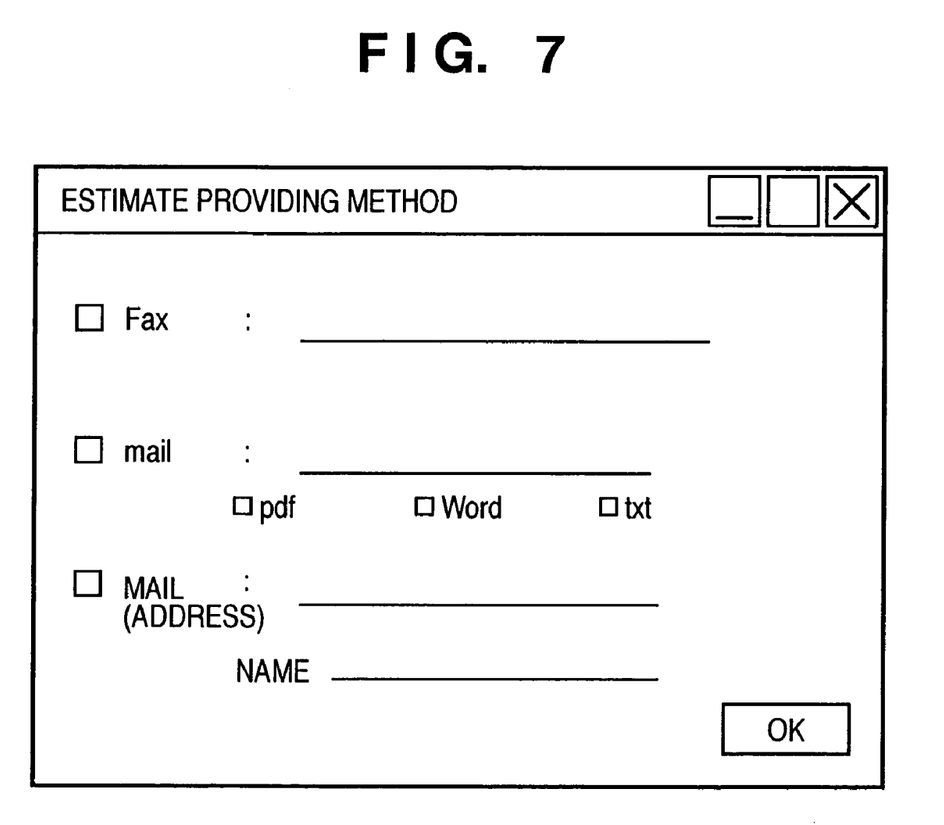
FIG. 7 is a view showing an estimate providing method designation window displayed on the user terminal 5 in the embodiment.

FIG. 7 is a view showing the estimate providing method designation window displayed on the user terminal 5 in this embodiment. The estimate providing method designation window is displayed on the display of the user terminal 5 on the basis of the information received from the remote negotiation system 1 in step S6.

On the estimate providing method designation window shown in FIG. 7, the user (customer) of the user terminal 5 can designate a detailed method to receive the commercial transaction document. In the example shown in FIG. 7, a facsimile number, an e-mail address and information format which are necessary for receiving document data, and an address and addressee which are necessary for acquiring information recorded on a storage medium such as a printing paper sheet can be input.

Steps S7 to S10: The providing method designated in step S6 is discriminated (step S7). For facsimile transmission, the estimate is transmitted to the designated facsimile number (step S8). For e-mail transmission, the document data of the estimate is transmitted to the designated mail address (step S9). For mailing, the estimate is mailed to the designated address (addressee) (step S10). If no designation is done, the flow advances to step S11.

Step S11: Information to display the estimate providing destination designation window for a third party (FIG. 8) is transmitted to the user terminal 5 used by the customer.

Figure 8:
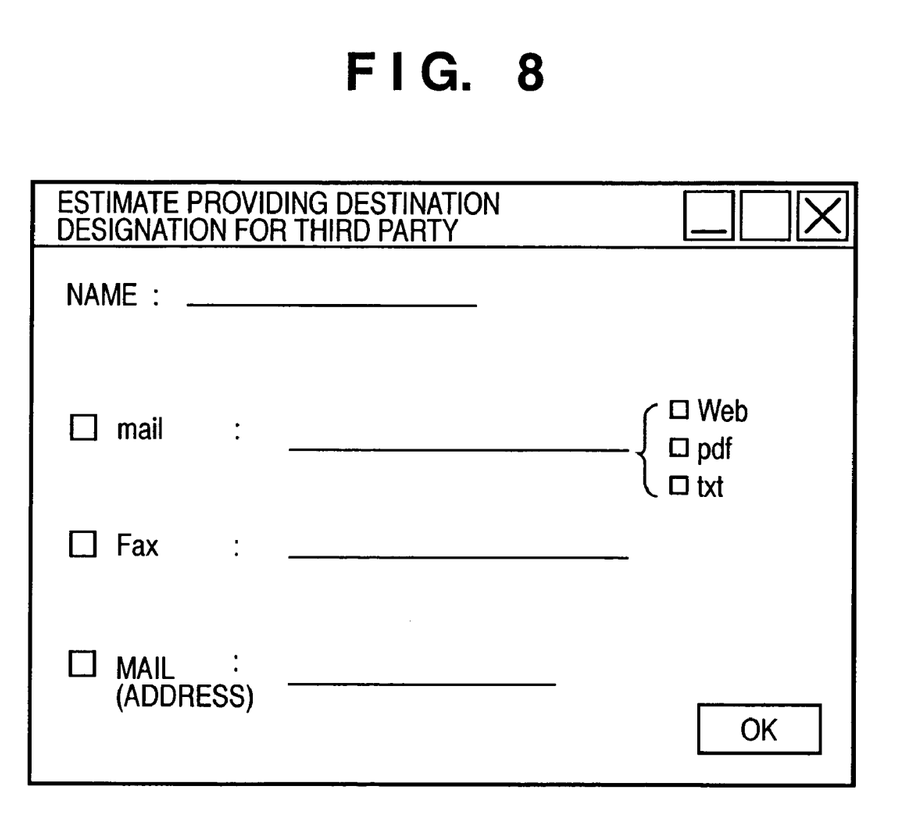
FIG. 8 is a view showing an estimate providing destination designation window for a third party, which is displayed on the user terminal 5 in the embodiment.

FIG. 8 is a view showing the estimate providing destination designation window for a third party, which is displayed on the user terminal 5 in this embodiment. The estimate providing destination designation window for a third party is displayed on the display of the user terminal 5 on the basis of the information received from the remote negotiation system 1 in step S11.

On the estimate providing destination designation window for a third party shown in FIG. 8, the user (customer) of the user terminal 5 can arbitrarily designate a third party (the customer's acquaintance or family) who can receive the commercial transaction document (in this case, the estimate). In the example shown in FIG. 8, the name of the third party, an e-mail address and information format for reception (including designation for causing the third party to browse the estimate in a predetermined Web page), which are necessary for receiving document data, a facsimile number, and an address necessary for acquiring information recorded on a storage medium such as a printing paper sheet can be input. As described above, in this embodiment, the method of providing information that allows a third party to browse the commercial transaction document can appropriately be selected by the customer himself/herself who grasps the communication environment usable by the third party at a high probability. Hence, the system is very rational and convenient.

Step S12: When the estimate providing destination to the third party is input in step S11, the flow advances to step S13. If no designation is input, the flow advances to step S15.

Step S13: Catalog data corresponding to the specifications of the vehicle that is specified by the prepared commercial transaction document (i.e., the estimate based on the information contents stored in the negotiation information storage memory (database) 2 in step S3 or S4) is automatically generated by referring to the catalog information in the database 3.

Step S14: Information related to the estimate is provided to the operation terminal used by the third party designated in step S11 in accordance with the designation. More specifically, information (catalog data or the address of the Web page to be browsed) about the catalog, which is automatically generated in step S13, is transmitted together with the same estimate providing address and password as those provided to the user terminal 5 ins step S5. Alternatively, the estimate recorded on a recording medium such as a printing paper sheet is mailed to the address designated in step S11. When the third party who has acquired the estimate providing address and password in this step accesses the Web page at a desired timing by using the acquired information, he/she can browse the contents of the estimate by using the same display window as that (FIG. 4) displayed on the user terminal 5.

The catalog data may be provided when the third party accesses the estimate providing address. In this embodiment, information about the catalog is provided to the designated third party in step S14. Even when the third party cannot participate in the remote negotiation together with the customer, the third party can browse not only the commercial transaction document such as an estimate but also a catalog corresponding to the commercial transaction document. Hence, the third party can easily grasp the detailed contents of the merchandise or service to be received by the customer. Accordingly, the third party can properly directly or indirectly be involved in the remote negotiation or assist (advise) the customer.

Steps S15 and S16: It is determined whether access to the Web page specified by the estimate providing address is done (step S15). If access is detected, it is determined whether the input password coincides with a predetermined password (step S16).

Step S17: If coincidence of password is confirmed in step S16, the user of the operation terminal that is accessing the Web page can be determined as the customer who uses the user terminal 5 or the third party designated by the customer. In this step, the document data of the estimate based on the information contents stored in the negotiation information storage memory (database) 2 in step S3 or S4 as the estimate in the temporary storage state or final storage state is provided to the operation terminal that is accessing the Web page. In this step, the catalog data automatically generated in step S13 may be provided together with the document data of the estimate in accordance with, e.g., a selection operation on the operation terminal that is accessing the Web page.

Steps S18 and S19: The type of the estimate preparation ending operation executed in step S2 (the storage state in the negotiation information storage memory 2) is determined (step S18). If the storage state is the temporary storage state, the flow advances to step S20. If the storage state is the final storage state, anti-tamper processing is executed for the individual information contents related to the estimate (or the document data of the estimate provided in step S17 on the basis of the information contents), which are already stored in the storage area for the customer in the negotiation information storage memory (database) 2. Then, together with information that specifies the salesperson in charge, the information contents and/or document data are stored in the storage area for the customer in the negotiation information storage memory (database) 2 as a formal document (paper document) used for the commercial transaction (step S19). The anti-tamper processing in step S19 can be executed by employing various kinds of general techniques.

Step S20: It is revealed as a result of confirmation in step S18 that the current storage state is the temporary storage state. The individual information contents related to the estimate (or the document data of the estimate provided in step S17 on the basis of the information contents), which are already stored in the storage area for the customer in the negotiation information storage memory (database) 2, are not a formal document (paper document) used for the commercial transaction yet. In this step, change of the estimate price in the salesperson terminal 6 is permitted. Accordingly, negotiation over the price can flexibly be done in the remote negotiation.

Step S21: It is determined whether the operation terminal whose access is detected in step S15 and S16 is the operation terminal used by the specific third party designated by the customer in advance or the user terminal 5 used by the customer. If the operation terminal is the operation terminal used by the specific third party, only browsing of the estimate based on the already registered information contents is permitted, and the flow advances to step S25. If the operation terminal is the user terminal 5 used by the customer, the flow advances to step S22.

Steps S22 and S23: Change (specification change) of the information contents of the commercial transaction document (in this case, the estimate) by the customer who uses the user terminal 5 is permitted within a predetermined range (step S22). When the information contents are changed within that range, an estimate price based on the individual changed information contents is calculated. The calculation result is reflected to the display area 24 of the display window (FIG. 4) displayed on the user terminal 5 and also stored in the storage area for the customer in the negotiation information storage memory (database) 2 (step S23).

More specifically, assume that the change of contents by the customer is permitted only in the temporary storage state. Even in this case, if the merchandise as an object is a car, and the model of the engine as a fundamental member of the car is changed by the receiver, the price at which the car can be provided may largely change. In addition, an impossible combination of specifications may occur on the document, so that the initial commercial transaction document may essentially become invalid. Alternatively, if the selected specifications or the vehicle grade is carelessly changed by the receiver, the price of the entire car largely changes in accordance with that change. In this case, in steps S22 and S23 of this embodiment, when the storage state is the temporary storage state, and the degree of change of the contents of the commercial transaction document by the customer exceeds the predetermined range (e.g., if the price exceeds a predetermined value or if the selected specifications of a specific fundamental member are changed), the change of the contents is automatically inhibited. Hence, the system is very rational and convenient.

In steps S21 to S23, when the selected storage state is the temporary storage state, and the third party who can browse the commercial transaction document in the temporary storage state browses it, the change of the contents of the commercial transaction document is inhibited. The contents of the commercial transaction document which are recognized by the customer and third party can be prevented from changing due to the time lag in browsing. Hence, the third party can be prevented from becoming unable to rationally be involved in the remote negotiation or assist (advise) the customer.

Step S24: That the contents of the commercial transaction document are changed by the customer is indicated on the salesperson terminal 6 by voice output or highlighting. With this operation, the contents can be prevented from being tampered to those unintended by the salesperson before he/she is aware of it.

Steps S25 and S26: It is determined whether, on the display window (FIG. 3 or 4) displayed on one operation terminal (i.e., the salesperson terminal 6, the user terminal 5, or the operation terminal used by the specific third party) on which the estimate in the temporary storage state can be at least browsed, the operation button 15 ("final storage") is operated (clicked on), and the OK button 16 is operated (step S25). If the final operation is detected, it is determined by referring to the operation log of each operator whether the final operation has been executed and the contents of the estimate have been approved by all the operators (step S26).

If no specific third party is designed by the customer, the determination in step S26 need not be executed. The final storage state need not always be set upon determining that the contents of the estimate have been approved because the final operation is executed. Instead, for example, when a predetermined period has elapsed or a contract (purchase order) is made, the storage state may be changed to the final storage state.

Steps S27 and S28: When execution of the final operation by all the operators is confirmed by the determination in step S26, the information contents of the estimate in the temporary storage state, which have already been stored, are set in the final storage state and stored in the storage area for the customer in the negotiation information storage memory (database) 2 as a formal document (paper document) used for the commercial transaction together with the information that specifies the salesperson in charge (step S27). In step S28, it is notified on the salesperson terminal 6 by using voice output or highlighting that the final operation is executed by all the operators. The salesperson who has received the notification in step S28 can smoothly advance the negotiation to the next process to, e.g., prepare a contract or purchase order.

According to the above-described embodiment, a commercial transaction document related to merchandise or a service specified by remote negotiation through a communication environment can be provided from the provider to the receiver.

More specifically, according to this embodiment, the salesperson (provider) can prepare and store a commercial transaction document such as an estimate, contract, or purchase order, which decides the price related to providing of a car specified by remote negotiation, on the same system by using the salesperson terminal 6 (first operation terminal). On the other hand, the receiver such as a customer can browse (display) the prepared commercial transaction document by using the user terminal 5 (second operation terminal). Hence, the system is very convenient.

According to this embodiment, the customer can not only browse the commercial transaction document displayed on the user terminal 5 that he/she is using but also acquire the commercial transaction document almost in real time or at a desired timing as a familiar printing product by operating the operation button 17 ("print") without waiting for providing by mail from the salesperson. Hence, the system is very convenient.

For merchandise such as a car, not only the customer as the party concerned but also a plurality of direct or indirect customers, including acquaintances and family, are often involved. According to this embodiment, the customer can designate, by using the estimate providing destination designation window for a third party (FIG. 8) in step S11, a third party who is permitted to browse the commercial transaction document having the same contents as those of the commercial transaction document that the customer can browse on the user terminal 5. The designated third party can browse the commercial transaction document having the same contents in processing from step S17. For this reason, the substantial convenience of the remote negotiation system can be maximized so that the salesperson and customer who do not physically exist in the same site can do face-to-face negotiation at remote sites.

According to this embodiment, in step S2, the storage state of the information contents of the commercial transaction document in the database 2 can alternatively be set to the temporary storage state or final storage state. Only in the temporary storage state, the change of the contents by the customer is permitted. Hence, the commercial transaction document based on the agreements of both parties can more properly be prepared by imparting flexibility to the system. The change of the contents by the customer can be done only when the temporary storage state is selected. Since the contents can be prevented from being tampered at a timing unwanted by the salesperson, the remote negotiation can efficiently be done while the salesperson takes the initiative.

In the above-described embodiment, the present invention is applied to a communication environment between information processing apparatuses such as computers, PDAs, and cellular phones using network communication. However, the present invention is not limited to this configuration. The present invention can also suitably be applied to various TV systems such as cable TVs and high-definition TVs capable of two-way communication.

The present invention described in the above embodiment is achieved by supplying a computer program capable of implementing the functions of the flow charts referred to in the description to the above-described remote negotiation system 1 and causing the CPU of the apparatus that constitutes the system to read out and execute the program. The computer program supplied to the apparatus is stored in a storage device such as a readable/writable memory or a hard disk device.

In this case, to supply the computer program to the apparatus, general procedures can be employed now by, e.g., installing the program in the apparatus through various recording media such as a flexible disk or downloading the program from an external device through a communication line such as the Internet. In such a case, the present invention is constituted by the codes of the computer program or a storage medium.

As many apparently widely different embodiments of the present invention can be made without departing from the spirit and scope thereof, it is to be understood that the invention is not limited to the specific embodiments thereof except as defined in the appended claims.

What is claimed is:

1. A remote negotiation apparatus which allows, before a sale of a vehicle, a first operation terminal used by a salesman of the vehicle and a second operation terminal used by a customer to bi-directionally communicate and remotely negotiate in real-time through a communication environment, the remote negotiation apparatus comprising:
a control unit; and
computer-executable instructions stored in computer-readable memory which when executed by the control unit:
cause a display of a predetermined form corresponding to a commercial transaction document related to the vehicle on the first operation terminal, cause a request of the salesman to input information content necessary for preparing the commercial transaction document, and cause storage of the input information content in a storage device, and which cause, on the basis of the information content stored in the storage device and updated in real-time, a display of a commercial transaction document on the second operation terminal having the same information content as the commercial transaction document prepared by the salesman,
wherein the commercial transaction document is at least one of an estimate, a contract, and a purchase order,
wherein the computer-executable instructions, when executed by the control unit, further cause a request for alternative selection between a temporary storage state and a final storage state as a storage state in storing the information content of the commercial transaction document in the storage device, and when the selected storage state is the temporary storage state, cause a condition in the apparatus whereby a change of the information content of the commercial transaction document by the customer is permitted, and the commercial transaction document is updated in real-time on the basis of the changed information content, and when the selected storage state is the final storage state, cause a condition in the apparatus whereby a change of the information content of the commercial transaction document by the customer is prohibited, and wherein the computer-executable instructions, when executed by the control unit, cause a condition in the apparatus which prohibits, even when the selected storage state is the temporary storage state, a change of the information content of the commercial transaction document when a degree of the change of the information content of the commercial transaction document by the customer exceeds a predetermined range.

2. The apparatus according to claim 1, wherein when the selected storage state is the temporary storage state and the customer completes a change of the information content of the commercial transaction document the salesman is notified that the customer has completed the change of the information content of the commercial transaction document.

3. The apparatus according to claim 1, wherein when the selected storage state is the temporary storage state, and an approval operation for the information content of the commercial transaction document in the temporary storage state is executed by the customer, said control unit executes to cause a condition in the apparatus which changes the storage state to the final storage state.

4. The apparatus according to claim 1 further comprising:
computer-executable instructions stored in computer-readable memory which when executed by the control unit:
facilitate receipt of an instruction, from the customer, for designating a third party who is permitted to browse the commercial transaction document having the same information content as that of the commercial transaction document that the customer is permitted to browse,
cause the control unit to provide, to the designated third party, information content related to the commercial transaction document having the same information content as that of the commercial transaction document provided to the customer, and
cause a condition in the apparatus which prohibits a change of the information content of the commercial transaction document by the designated third party, even when the selected storage state is the temporary storage state.

5. The apparatus according to claim 1, wherein the information content of the commercial transaction document specifies a providing price of the vehicle, and when the selected storage state is the temporary storage state, said control unit executes to cause a condition in the apparatus which permits a change, by the salesman, of the providing price of the vehicle.

6. A remote negotiation method of allowing, before a sale of a vehicle, a first operation terminal used by a salesman of the vehicle and a second operation terminal used by a customer to bi-directionally communicate and remotely negotiate in real-time through a communication environment, the remote negotiation method comprising:
displaying a predetermined form corresponding to a commercial transaction document related to the vehicle on the first operation terminal;
requesting the salesman to input information content necessary for preparing the commercial transaction document;
storing the input information content in a storage device;
receiving a commercial transaction document browsing request from the customer;
upon receiving the browsing request from the customer, displaying on the basis of the information content stored in the storage device and updated in real-time on the second operation terminal, a commercial transaction document having the same information content as the commercial transaction document prepared by the salesman;
requesting alternative selection between a temporary storage state and a final storage state as a storage state in storing the information content of the commercial transaction document in the storage device, and when the selected storage state is the temporary storage state, permitting a change of the information content of the commercial transaction document by the customer and updating the commercial transaction document in real-time on the basis of the changed information content, and when the selected storage state is the final storage state, prohibiting a change of the information content of the commercial transaction document by the customer,
wherein the commercial transaction document is at least one of an estimate, a contract, or a purchase order; and
prohibiting, even when the selected storage state is the temporary storage state, a change of the information content of the commercial transaction document by the customer when a degree of the change of the information content of the commercial transaction document exceeds a predetermined range.

7. Computer-executable instructions stored in computer-readable media which, when executed by a computer, cause the computer to conduct a remote negotiation method of allowing, before a sale of a vehicle, a first operation terminal used by a salesman of the vehicle and a second operation terminal used by a customer to bi-directionally communicate and remotely negotiate in real-time through a communication environment, the remote negotiation method comprising:
displaying a predetermined form corresponding to a commercial transaction document related to the vehicle on the first operation terminal;
requesting the salesman to input information content necessary for preparing the commercial transaction document;
storing the input information content in a storage device;
receiving a commercial transaction document browsing request from the customer;
upon receiving the browsing request from the customer, displaying on the basis of the information content stored in the storage device and updated in real-time on the second operation terminal, a commercial transaction document having the same information content as the commercial transaction document prepared by the salesman;
requesting alternative selection between a temporary storage state and a final storage state as a storage state in storing the information content of the commercial transaction document in the storage device, and when the selected storage state is the temporary storage state, permitting a change of the information content of the commercial transaction document by the customer, and updating the commercial transaction document in real-time on the basis of the changed information content, and when the selected storage state is the final storage state, prohibiting a change of the information content of the commercial transaction document by the customer, wherein the commercial transaction document is at least one of an estimate, a contract, or a purchase order; and prohibiting, even when the selected storage state is the temporary storage state, a change of the information content of the commercial transaction document by the customer when a degree of the change of the information content of the commercial transaction document exceeds a predetermined range.

* * * * *

UNITED STATES PATENT AND TRADEMARK OFFICE
CERTIFICATE OF CORRECTION

PATENT NO. : 7,089,215 B2
APPLICATION NO. : 10/761404
DATED : August 8, 2006
INVENTOR(S) : Shinya Yamasaki

It is certified that error appears in the above-identified patent and that said Letters Patent is hereby corrected as shown below:

Column 13, Line 22, change "document" to --document,--.

Column 14, Line 20, change "customer" to --customer,--.

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,089,215 B2 Page 1 of 1
APPLICATION NO. : 10/761404
DATED : August 8, 2006
INVENTOR(S) : Shinya Yamasaki It is certified that error appears in the above-identified patent and that said Letters Patent is hereby corrected as shown below:

On the title page, and column 1, line 1: (Title), change "REMOTE NEGOTIATION APPARATUS, REMOTE NEGOTIATION METHOD, AND PROGRAM PRODUCT" to --REMOTE NEGOTIATION APPARATUS, REMOTE NEGOTIATION METHOD, AND PROGRAM--.

Signed and Sealed this

Fifth Day of June, 2007

JON W. DUDAS
*Director of the United States Patent and Trademark Office*